Dec. 21, 1948.  W. P. YURGENSEN  2,456,664
SPLIT CHUCK FOR ELECTRIC WELDING GUNS

Filed Nov. 29, 1945

INVENTOR.
WILLIAM P. YURGENSEN.
BY *M. O. Hayes*

ATTORNEY.

Patented Dec. 21, 1948

2,456,664

UNITED STATES PATENT OFFICE 2,456,664

SPLIT CHUCK FOR ELECTRIC WELDING GUNS

William P. Yurgensen, Sharon Hill, Pa.

Application November 29, 1945, Serial No. 631,762

8 Claims. (Cl. 279—55)

(Granted under the act of March 3, 1883, as amended April 30, 1928; 370 O. G. 757)

This invention relates to a chuck to be used with an electric welding gun.

An object of this invention is to provide an improved split chuck to be used with welding guns for the welding of pins, nails, and the like to metal.

Another object is to provide a chuck having a single slot and with detachable ears to be used with welding guns for the welding of pins and the like to metal.

Further objects and advantages of this invention, as well as its construction, arrangement and operation, will be apparent from the following description and claims in connection with the accompanying drawings, in which, Fig. 1 is a side view of the chuck.

Figure 1:
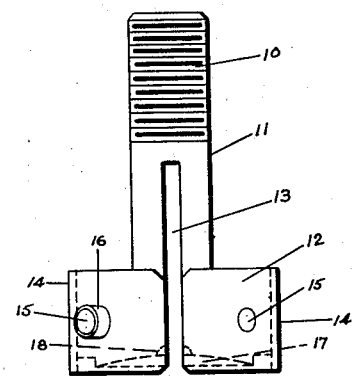
Figure 2:
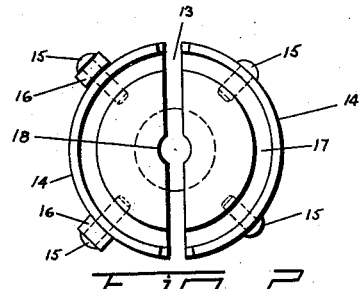
Fig. 2 is an end view of the chuck.

The thread 10 on shank 11 is cut to fit a welding gun. The head 12 and a portion of the shank 11 are slotted at 13 thereby making a split chuck. Two ears 14, preferably made from copper, copper alloy or similar material, are bolted to the head 12, one on each side, by bolts 15. Two of the bolts 15, preferably both holding the same ear, are furnished with washers 16 of rubber or other resilient material.

The ears 14 are extended beyond the face 17 of the head. Face 17 is substantially concave and in the center a recess 18, preferably substantially hemispherical, is provided.

Figure 3:
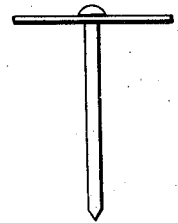
Fig. 3 shows a type of pin which can be welded to metal by the use of the chuck.

In Fig. 3 is shown a nail or pin of the type such as a "Nelson-Headed" nail that can be welded to metal by the use of this chuck.

In operation the chuck is fastened to a welding gun. A pin such as shown in Fig. 3, is placed in the chuck with the ears 14 gripping the nail disk. A gripping force is supplied through the resilient washers 16. The point of the pin is placed against a metal surface and welded thereto. By the use of a slight force and a twist the chuck is easily detached from the welded pin.

The foregoing operation has been found of particular value in attaching fiber glass insulation to walls or bulkheads.

This chuck is an improvement over other chucks in that it requires no springs or other clamping device as the pin can be positioned in the chuck by hand.

The ears are detachable and can be easily replaced when burnt or worn out. This increases the life of the chuck over other types with permanent ears.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A chuck for a welding gun, comprising a bifurcated shank and circular head, two detachable ears substantially semicylindrical facing the two bifurcated portions of said head, said ears being attached by bolts, and a resilient washer on at least one of said bolts holding said ear to attach yieldingly said ear to said head.

2. A chuck comprising a body, said body at one end being longitudinally slotted to provide a plurality of longitudinally extending portions, said portions being flexible with respect to each other in a transverse direction, and a plurality of ears detachably secured to the periphery of said portions and extending beyond the slotted end of said body.

3. A chuck comprising a body, said body at one end being longitudinally slotted to provide bifurcations, said bifurcations being flexible with respect to each other in a transverse direction, and a pair of ears detachably secured one on the periphery of each of said bifurcations and extending beyond the end of said bifurcations.

4. A chuck comprising a body, said body including a shank and a circular head formed at one end of said shank, said body being longitudinally slotted to form said head into bifurcations, said bifurcations being flexible with respect to each other in a transverse direction, and a pair of semi-circular ears detachably secured one on the periphery of each of said bifurcations and extending beyond the end of the bifurcations, said ears being arranged in opposed relation.

5. A chuck comprising a body, a plurality of ears disposed about the periphery of said body at one end thereof, said ears being disposed in opposed relation and extending beyond the end of said body, means securing at least one of said ears to said body, said means for at least one ear including a pad element of resilient material adjacent said ear to secure yieldingly said ear to said head for yieldingly gripping a piece of work.

6. A chuck comprising a body, said body including a shank and a circular head formed at one end of said shank, said head having a concave face at the extremity remote from said shank, said body being longitudinally slotted to form said head into semi-circular furcations, said furcations being flexible with respect to each other in a transverse direction, and a pair of ears disposed one adjacent the periphery of each of said furcations and extending beyond the end of the furcations, said ears being semi-circular and arranged in opposed relation, means for detachably securing said ears to said furcations, said means for at least one ear including a bolt extending through said ear and fastened in said head and having an enlarged bolt head, and a rubber washer on said bolt between said ear and said bolt head to secure yieldingly said ear to said head with respect to transverse movement for yieldingly gripping a piece of work and to rigidly secure said ear to said head with respect to movement in other directions.

7. A chuck comprising a body, said body at one end being longitudinally slotted to provide a plurality of longitudinally extending portions, said portions being flexible with respect to each other in a transverse direction, and a plurality of ears detachably secured to the periphery of said portions and located at the slotted end of said body.

8. A chuck comprising a body, said body at one end being longitudinally slotted to provide a plurality of longitudinally extending portions, said portions being flexible with respect to each other in a transverse direction, and a plurality of ears detachably secured to said portions and located at the slotted end of said body.

WILLIAM P. YURGENSEN.

REFERENCES CITED

The following references are of record in the file of this patent:

UNITED STATES PATENTS

| Number | Name | Date |
| --- | --- | --- |
| Re. 22,317 | Nelson | May 18, 1943 |
| 60,258 | Russell | Dec. 4, 1866 |
| 978,055 | Owens | Dec. 6, 1910 |
| 1,419,222 | Chadderton et al. | June 13, 1922 |
| 2,378,720 | Nelson | June 19, 1945 |